United States Patent [19]
Kimura et al.

[11] 3,773,620
[45] Nov. 20, 1973

[54] PROCESS FOR PRODUCING CITRIC ACID ISOCITRIC ACID AND MICROBIAL CELLS BY FERMENTATION

[75] Inventors: Kazuo Kimura; Toru Nakanishi, both of Tokyo, Japan

[73] Assignee: Kyowa Hakko Kogyo Co., Ltd., Tokyo, Japan

[22] Filed: Sept. 24, 1970

[21] Appl. No.: 75,240

[30] Foreign Application Priority Data
Oct. 9, 1969 Japan.............................. 44/80333
Nov. 21, 1969 Japan.............................. 44/92925

[52] U.S. Cl. ............................... 195/28 R, 195/47
[51] Int. Cl. ........................................... C12b 1/00
[58] Field of Search ................... 195/28, 36, 37, 47, 195/49, 114

[56] References Cited
UNITED STATES PATENTS
3,652,396 3/1972 Tanaka et al. .................... 195/28 R
3,563,857 2/1971 Oki et al. ............................. 195/49

FOREIGN PATENTS OR APPLICATIONS
1,571,551 6/1969 France
2,005,848 8/1970 Germany

*Primary Examiner*—A. Louis Monacell
*Assistant Examiner*—R. B. Penland
*Attorney*—Craig, Antonelli, Stewart & Hill

[57] ABSTRACT

Processes for producing citric acid together with microbial cells as well as producing increased yields of citric acid and/or isocitric acid by fermentation are described. Hydrocarbon-assimilating microorganisms are employed in media containing hydrocarbons as the main carbon source. The addition of alcohols, such as $C_1$-$C_{20}$ saturated alcohols, to the medium permits the accumulation of citric acid together with the obtained microbial cells. The addition of ferrocyanides, such as potassium or sodium ferrocyanide, to the medium enhances the yield of isocitric acid, while the addition of monofluoroacetic acid or a salt thereof to the medium enhances the yield of citric acid.

14 Claims, No Drawings

PROCESS FOR PRODUCING CITRIC ACID ISOCITRIC ACID AND MICROBIAL CELLS BY FERMENTATION

This invention relates to a process for producing citric acid and isocitric acid, as well as microbial cells. More particularly, it relates to a process for the production of citric acid, isocitric acid and microorganism cell bodies by fermentation. Even more particularly, the invention relates to said fermentation process using hydrocarbon-assimilating microorganisms.

Attempts to obtain various microorganism products using hydrocarbons as the main carbon source have received a great amount of attention recently, and there have been numerous reports in the literature regarding the production of microbial cells, including yeast cell bodies, amino acids, nucleic acids, organic acids, sugars, enzymes, vitamins, etc.

Insofar as the production of citric acid is concerned, among the organic acids, processes based upon the use of bacteria, the use of molds and the use of yeasts have previously been developed in the art. However, these processes are not satisfactory for producing citric acid because the production yields are low, the culturing times are prolonged and the product is sometimes obtained as a mixture with isocitric acid, which is difficult to separate from citric acid.

With respect to the production of microorganism cell bodies, improved methods for producing high yields of microbial cells from hydrocarbons have been developed with a consequent reduction in the production cost. However, since most of the microbial cells are utilized as animal feed, it is necessary and desirable to further lower the cost of production. On the other hand, the formation of microbial cells from hydrocarbons is carried out through complicated reactions in the living body. It has been found to be very useful to recover and utilize beneficial substances in the metabolization step in these reactions in order to effectively utilize raw material resources. However, in such a case, the principal object is to solely produce cell bodies and, therefore, it is natural that only a small amount of by-products is formed in the culture liquor. Furthermore, as the production of the microbial cells is carried out on a mass production scale, it is necessary to treat a very large amount of broth. Accordingly, the recovery of the by-products from the culture liquor is restricted only to the recovery of readily recoverable products. In this respect, citric acid has a low solubility and, if it is present in the calcium salt form, it is substantially insoluble in hot water. Therefore, it is very easy to recover citric acid from such broths.

The processes for producing citric acid mentioned above, involving the use of bacteria, the use of molds or the use of yeasts, are directed only to the production of citric acid, wherein the citric acid is formed by controlling the growth of the microbial cells in a suitable manner, for example, by the addition of a metabolism-inhibiting agent, restriction of the amount of nitrogen or control of some other nutrient source, and, hence, bringing about some deviation in the metabolism. On the other hand, when microbial cells are produced from hydrocarbons in accordance with the standard procedures, sufficient and necessary nutrient sources for the formation of the microbial cells are employed, with the result that only a very small amount of the metabolism intermediate substances is accumulated in the culture liquor and no or substantially no citric acid is detected at all.

Using these criteria, the present inventors have sought ways of accumulating and producing citric acid and isocitric acid by fermentation, while also producing significant amounts of microbial cells. In doing these studies, an improved process for producing citric acid and isocitric acid by fermentation has also been developed.

Accordingly, one of the objects of the present invention is to provide an improved process for the production of citric acid and isocitric acid which overcomes the disadvantages and deficiencies of the prior art methods.

Another object of the present invention is to provide a process for producing considerable amounts of citric acid together with microbial cells by fermentation which may be carried out in an efficacious and relatively simple manner.

A further object of the invention is to provide a process for producing citric acid, isocitric acid and/or microbial cells by fermentation which may be carried out advantageously on an industrial scale at low cost to give a high yield of product.

A still further object of the invention is to provide citric acid, isocitric acid and/or microorganism cell bodies.

These and other objects and advantages of the present invention will become apparent to those skilled in the art from a consideration of the following specification and claims.

In accordance with the present invention, it has been found that, when attempts were made to produce microbial cells from hydrocarbons, a considerable amount of citric acid was accumulated in the culture liquor by adding an alcohol to the medium without affecting the production yield of the microbial cells from the hydrocarbons. It was further discovered that the protein content of the thus-obtained microbial cells was slightly increased, as compared with the case where the only hydrocarbons were used as the carbon source.

Other studies have shown that certain additives to the nutrient medium have a great effect upon the accumulation and yield of citric acid and isocitric acid in the culture liquor. Using appropriate additives, the isolation and recovery of the product citric acid or isocitric acid can be made much simpler. In order to detect chemicals having an effect upon the development or increase in the productivity of citric acid, using a hydrocarbon-assimilable microorganism and hydrocarbons as the main carbon source, the present inventors have made careful studies of various aconitase-inhibiting agents, metal-chelating agents, alcohols, surfactants, deionizing agents, fluorides, etc., and have found that potassium ferrocyanide and monofluoroacetic acid have a remarkable effect. Hence, it has been found that the yield of isocitric acid is greatly increased by the addition of potassium ferrocyanide to the medium, whereas the yield of citric acid is considerably increased by the addition of monofluoroacetic acid to the medium. The addition of these compounds to the media not only effects the yield and accumulation of isocitric acid and citric acid, but also has a considerable effect upon the variation in formation ratio of these organic acids by means of the increase in the productivities thereof.

Discussing this latter embodiment of the invention in more detail, the addition of an effective amount up to about 5% by weight of potassium ferrocyanide to the medium provides the benefits discussed hereinabove. The amount of monofluoroacetic acid to be added to the medium ranges from an effective amount up to about 20 mM. However, it is difficult to draw a strict line of concentration since the amounts will vary depending upon the particular microorganism employer and the fermentation conditions. Moreover, the concentration can be varied in relation to the time of addition. Although the additives can be provided to the nutrient medium all at one time or intermittently, the optimum time for the addition is during the relatively initial stages of culturing, with the best results being obtained usually between 0 and 24 hours of cultivation.

The fact that the productivity of isocitric acid is enhanced by the addition of potassium ferrocyanide to the medium is novel to the art and is believed to constitute an extremely advantageous way for producing citric acid as well as isocitric acid, which are important metabolism intermediate products.

While the formation and accumulation of citric acid using monofluoroacetic acid as an additive in the medium has been reported in the prior art, this procedure was conducted using a saccharine material as the carbon source. This provision has not been conducted using a hydrocarbon-assimilable microorganism. The present invention is the first to disclose the addition of monofluoroacetic acid to a nutrient medium to obtain considerable amounts of citric acid, making it possible to conduct the process of the invention on an industrial scale. Moreover, the culturing procedure is greatly simplified in accordance with the invention by the fact that the monofluoroacetic acid can be added to the medium at the initiation of culturing.

Particularly when hydrocarbons are used as the carbon source, a smooth action of aconitase activity is thought to be necessary, and, thus, it seems that the effect of potassium ferrocyanide or monofluoroacetic acid is so peculiar that it cannot be simply explained only from the function which has been heretofore reported in the literature. Yet, using these additives, the present invention provides a procedure for producing citric acid and isocitric acid which can be conducted commercially.

In connection with the first embodiment of the invention, wherein citric acid and microbial cells are produced by fermentation using an alcohol as the additive in the medium, it has been found that alcohols in general may be used in this connection. However, alcohols having one to 20 carbon atoms are particularly effective, and the preferred alcohols to be employed are saturated alcohols having one to 20 carbon atoms. These alcohols themselves are effectively assimilated by the microorganisms employed and also show an inhibiting action. Thus, it is necessary to properly select the concentration thereof.

The effects of adding various alcohols upon the yield of microbial cells, the cell body protein content and the formation of citric acid are shown in Table 1 below, wherein microbial cells were produced from n-paraffins using Candida zeylanoides ATCC 15585. These experimental data are the results obtained when culturing was carried out with aerobic shaking in flasks for 36 hours, the composition of the culturing medium being as follows:

n-paraffin ($C_{15}$, $C_{16}$, $C_{17}$, $C_{18}$) (equal volume mixture): 2.0%(V/V)
$NH_4Cl$: 2.0%(W/V)
$KH_2PO_4$: 0.1
$K_2HPO_4$: 0.1
$MgSO_4 \cdot 7H_2O$: 0.1
$FeSO_4 \cdot 7H_2O$: 0.002
$ZnSO_4 \cdot 7H_2O$: 0.004
$MnSO_4 \cdot 4H_2O$ 0.001
$CuSO_4 \cdot 5H_2O$: 0.001
Cornsteep liquor: 0.1
Thiamine hydrochloride: 300γ/l
$CaCO_3$: 0.5%(W/V

TABLE 1

Effects of addition of various alcohols

| Alcohol | Concentration %(V/V) | Yield of cell bodies (dry) mg./ml. | Crude protein content of cell bodies (dry) % | Yield of citric acid mg./ml. |
|---|---|---|---|---|
| No addition | 0 | 11.9 | 62.4 | 0 |
| Methanol | 0.1 | 12.1 | 62.4 | 0.5 |
| | 0.2 | 12.3 | 62.7 | 0.8 |
| | 0.3 | 12.6 | 63.1 | 1.5 |
| | 0.4 | 12.7 | 62.9 | 2.6 |
| | 0.5 | 13.1 | 63.2 | 3.4 |
| Ethanol | 0.2 | 14.6 | 62.8 | 0.4 |
| | 0.4 | 17.2 | 62.6 | 0.6 |
| | 0.6 | 19.1 | 63.3 | 1.2 |
| | 0.8 | 21.4 | 63.9 | 2.0 |
| | 1.0 | 23.2 | 64.5 | 2.5 |
| Butanol | 0.1 | 12.0 | 62.4 | 0.3 |
| | 0.2 | 12.2 | 62.8 | 0.7 |
| | 0.3 | 12.6 | 63.6 | 1.2 |
| | 0.4 | 12.5 | 63.2 | 1.8 |
| | 0.5 | 12.3 | 63.3 | 2.1 |
| Lauryl alcohol | 0.2 | 14.7 | 63.6 | 0.3 |
| | 0.4 | 15.6 | 64.2 | 0.7 |
| | 0.6 | 17.7 | 65.1 | 1.6 |
| | 0.8 | 21.6 | 66.0 | 2.8 |
| | 1.0 | 24.7 | 65.7 | 3.6 |
| Stearyl alcohol | 0.2 | 13.1 | 63.1 | 0.3 |
| | 0.4 | 15.9 | 63.8 | 0.6 |
| | 0.6 | 18.2 | 64.4 | 1.6 |
| | 0.8 | 21.8 | 65.8 | 2.1 |
| | 1.0 | 23.7 | 65.1 | 3.3 |
| Oleyl alcohol | 0.2 | 13.1 | 63.1 | 0.4 |
| | 0.4 | 16.1 | 65.2 | 0.8 |
| | 0.6 | 19.2 | 66.0 | 1.9 |
| | 0.8 | 21.1 | 65.3 | 2.6 |
| | 1.0 | 24.3 | 65.7 | 3.8 |

As is clear from Table 1, no citric acid is formed at all in the culture liquor when an alcohol is not added to the medium. However, a small amount of citric acid is formed and accumulated when various alcohols are added thereto. Furthermore, the microorganism employed is capable of assimilating alcohols having 10 to 20 carbon atoms and forms microbial cells in a yield (based on carbon) which is almost as good as that from n-paraffins or ethanol. In addition, as is clear from Table 1, it is noted that the protein content is somewhat increased by the addition of an alcohol to the medium.

Hydrocarbon-assimilating microorganisms, including bacteria, yeasts, molds, etc. in a wide range, can be employed in the present invention. Preferred bacteria are those belonging to the genera Arthrobacter, Corynebacterium, Brevibacterium or Nocardia. The preferred yeasts are those belonging to the genera Candida, Torulopsis, Endomyces, Pichia, Hansenula, Mycoderma or Endomycopsis. Preferred molds are those of the genus Aspergillus or the genus Penicillium.

Either a synthetic culture medium or a natural nutrient medium is suitable in the fermentation process of the present invention as long as it contains the essential nutrients for the growth of the microorganism strain employed. Such nutrients are well known in the art and include substances such as a carbon source, a nitrogen source, inorganic compounds and the like which are utilized by the microorganism employed in appropriate amounts. The fermentation in connection with the present invention is conducted in an aqueous nutrient medium containing a hydrocarbon or a mixture of hydrocarbons as the main carbon source. Such hydrocarbons include straight and branched-chain paraffins (alkanes), particularly those having from 11 to 20 carbon atoms, such as n-pentane, n-octane, n-decane, n-dodecane, n-hexadecane, isopentane, osooctane, etc., cycloparaffins such as cyclohexane and cyclooctane, straight- and branched-chain olefins such as pentene-2, hexene-1, octene-1, octene-2, etc., cycloolefins such as cyclohexene, aromatic hydrocarbons such as benzene, o-xylene, etc., and mixtures thereof and mixed hydrocarbons such as kerosene, light oils, heavy oils, paraffin oils, etc. Small amounts of other carbon sources such as carbohydrates, for example, glucose, fructose, maltose, sucrose, starch, starch hydrolysate, molasses, etc., or any other suitable carbon source such as glycerol, mannitol, sorbitol, organic acids, etc. may be used in the fermentation medium along with the hydrocarbon. These substances may be used either singly or in mixtures of two or more.

As a nitrogen source, various kinds of inorganic or organic salts or compounds, such as urea or aqueous ammonia or ammonium salts such as ammonium chloride, ammonium sulfate, ammonium nitrate, ammonium phosphate, ammonium acetate, etc., or one or more than one amino acid mixed in combination, or natural substances containing nitrogen, such as cornsteep liquor, yeast extract, meat extract, fish meal, peptone, bouillon, casein hydrolysates, fish solubles, rice bran extract, etc. may be employed. These substances may also be used either singly or in combinations of two or more.

Inorganic compounds which may be added to the culture medium include magnesium sulfate, sodium phosphate, potassium dihydrogen phosphate, potassium monohydrogen phosphate, iron sulfate or other iron salts, manganese chloride, calcium chloride; sodium chloride, etc. Moreover, it may also be necessary to add certain essential nutrients to the culture medium, depending upon the particular microorganism employed, such as amino acids, for example, aspartic acid, threonine, methionine, etc., and/or vitamins, for example, biotin, thiamine, cobalamin and the like.

In some instances, it may be necessary or desirable to use an alcohol, a mono- or dicarboxylic acid or a natural fat or oil, or a mixture thereof, as the carbon source or at least a part of the carbon source in the medium. The addition of vegetable oil, an animal oil and/or a surfactant may also be effective in helping to increase the yield of product.

The fermentation or culturing of the microorganisms is conducted under aerobic conditions, such as aerobic shaking of the culture or with stirring and aeration of a submerged culture, at a temperature of, for example, about 15° to 45° C. and at a pH of, for example, about 1.0 to 9.0 in the case of the former embodiment wherein an alcohol is added to the medium, and at a temperature of, for example, about 20° to 37° C. and at a pH of, for example, about 1.0 to 7.5 in the case of the latter embodiment wherein potassium ferrocyanide or monofluoroacetic acid is added to the medium.

The following examples are given merely as illustrative of the present invention and are not to be considered as limiting. Unless otherwise noted, the percentages therein and throughout the application are by weight per volume of water. The desired products are recovered by conventional means, such as ion exchange resin treatment, extraction with solvents, precipitation, adsorption, chromatography or the like.

EXAMPLE 1

18.9 liters of a fermentation medium having the following composition is placed into a 30-liter volume jar fermentor:

2.5% (V/V) n-paraffins ($C_{12}$, $C_{13}$, $C_{14}$)(equal volume mixture)
2.0% (W/V) $NH_4Cl$
0.1% $KH_2PO_4$
0.1% $K_2HPO_4$
0.1% $MgSO_4 \cdot 7H_2O$
0.001% $MnSO_4 \cdot 4H_2O$
0.002% $FeSO_4 \cdot 7H_2O$
0.001% $ZnSO_4 \cdot 7H_2O$
0.0005% $CuSO_4 \cdot 5H_2O$
0.0065% $(NH_4)_6Mo_7O_{24} \cdot 4H_2O$
0.0002% $H_3BO_3$
500γ/ml Nonion LP–20R(surfactant)
1 ml/l soybean oil
200γ/l thiamine hydrochloride
0.05% cornsteep liquor One liter of a microbial seed liquor of *Torulopsis famata* ATCC 15586 is added to the above fermentation medium. Then, 0.1 liter of ethanol is also added thereto. Culturing is carried out at a cultivation temperature of 34° C. with aeration at the rate of 20 liters/minute and with stirring at the rate of 500 r.p.m. The pH is kept at 6.50 with 18% aqueous ammonia during the culturing.

After 42 hours, the culturing is completed, and the concentration of microbial cells in the culture liquor reaches 20 mg/ml. The yield of citric acid is 3.0 mg/ml.

As a comparison, culturing is carried out in the same manner in a medium containing no ethanol. The concentration of formed cell bodies is 14 mg/ml, and no by-product citric acid is observed at all.

The microbial cells obtained as a result of adding ethanol to the medium are repeatedly washed several times in a Sharples centrifugal separator and subjected to centrifugal separation. After freeze-drying, 365 g. of cell bodies is obtained. The protein content per cell body is 61%. However, when cultivation is conducted in a medium containing no ethanol, only 246 g. of cell bodies is obtained with a protein content of 59%.

After removing the microbial cells from the culture liquor, 200 g. of calcium chloride is added, and the pH is adjusted to 8.0 with aqueous ammonia. The resultant liquor is heated at 100° C. for 5 minutes, and the obtained crystals of calcium citrate are filtered and 2 liters of water is added to the crystals. The pH is adjusted to 2.0 with hydrochloric acid, thereby dissolving the calcium citrate. Then, by repetition of this operation, 65 g. of calcium citrate crystals is obtained.

EXAMPLE 2

Three hundred ml. of a microbial seed solution of Nocardia paraffinica ATCC 21198 is added to 3 liters of a fermentation medium contained in a 5-liter jar fermentor and having the following composition:

3.5% (V/V) n-paraffins ($C_{12}$, $C_{13}$, $C_{14}$) (equal volume mixture)
0.1% (W/V) $KH_2PO_4$
0.1% $Na_2HPO_4 \cdot 12H_2O$
0.05% $MgSO_4 \cdot 7H_2O$
0.0005% $ZnSO_4 \cdot 7H_2O$
0.05% cornsteep liquors
2.5% $(NH_4)_2SO_4$
0.01% $CaCl_2$ Added to the above fermentation medium is 15 ml. of methanol. Cultivation is then carried out at 28° C. with aeration at the rate of 3 liters/minute and with stirring at the rate of 650 r.p.m. The pH is kept at 7.0 with 18% aqueous ammonia during the cultivation.

Culturing is finished after 40 hours. The concentration of formed cell bodies is 21.0 mg/ml, and the yield of citric acid is 2.0 mg/ml. When culturing is conducted without the addition of methanol, the concentration of formed cell bodies is 20.8 mg/ml but the formation of citric acid is not observed at all.

By subjecting the culture liquor to the same procedures as described in Example 1, microbial cells and crystals of calcium citrate are obtained. The yield amounts to 53 g. of cell bodies (dry) and 6.1 g. of calcium citrate. When culturing in the medium containing no methanol, 52 g. of cell bodies (dry) is obtained. The protein content of the microbial cells obtained in accordance with the invention is 57.1%, while the protein content of the microbial cells obtained by culturing in the medium containing no methanol is 56.3%.

EXAMPLE 3

Three liters of a fermentation medium having the following composition is placed in a 5-liter jar fermentor:

4% (V/V) n-paraffins ($C_{12}$, $C_{13}$, $C_{14}$) (equal volume mixture)
2.0% (W/V) $NH_4NO_3$
0.1% $KH_2PO_4$
0.05% $K_2HPO_4$
0.05% $MgSO_4 \cdot 7H_2O$
0.0001% $MnSO_4 \cdot 2H_2O$
0.002% $FeSO_4 \cdot 7H_2O$
0.0005% $CuSO_4 \cdot 5H_2O$
0.001% $ZnSO_4 \cdot 7H_2O$
200γ/ml Nonion OT-221 (surfactant)
1 ml/l soybean oil
1 mg/l thiamine hydrochloride
0.5% (V/V) lauryl alcohol Then, 300 ml. of a culture solution of Penicillium janthinellum ATCC 13154 is added thereto as the seed microorganism. Culturing is carried out at 26° C. with aeration at the rate of 3 liters/minute and with stirring at 650 r.p.m. for 3 days. The initial pH is 6.0.

The concentration of formed cell bodies reaches 30 mg/ml, together with a yield of citric acid of 1.8 mg/ml. When culturing is conducted in a medium containing no lauryl alcohol, the concentration of formed cell bodies is 24 mg/ml, and no citric acid is formed at all. By subjecting the culture liquor to the same treatment as described in Example 1, 85 g. of cell bodies and 5.6 g. of crystals of calcium citrate are obtained. The protein content of the cell bodies is 36%. When cultivation is conducted in a medium containing no lauryl alcohol, 69 g. of cell bodies is obtained having a protein content of 31%.

EXAMPLE 4

Placed in a 5-liter jar fermentor is 3 liters of a fermentation medium comprising:

3.0% (V/V) n-paraffins ($C_{12}$, $C_{13}$, $C_{14}$) (equal volume mixture)
0.1% (V/V) $KH_2PO_4$
0.1% $K_2HPO_4$
0.3% KCl
0.1% $MgSO_4 \cdot 7H_2O$
0.005% $FeSO_4 \cdot 7H_2O$
0.001% $ZnSO_4 \cdot 7H_2O$
0.001% $MnSO_4 \cdot 4H_2O$
0.02% cornsteep liquor
2.5% $(NH_4)_2SO_4$
0.3% $CaCl_2$
100 γ/l thiamine hydrochloride Added to the above medium is 300 ml. of a microbial seed solution of Arthrobacter paraffineus ATCC 15591. Culturing is then carried out at 30°C. with aeration at the rate of 3 liters/minute and with stirring at the rate of 800 r.p.m., while keeping the pH at 6.80 with 28% aqueous ammonia. Then, 6 hours after the initiation of culturing, 15 ml. of n-amyl alcohol is added thereto. The yield of microbial cells reaches a maximum after 24 hours of culturing, the concentration thereof being 18.5 mg/ml. The yield of citric acid is 1.3 mg/ml. Culturing conducted as a control in the same medium but containing no n-amyl alcohol gives a concentration of microbial cells of 18.0 mg/ml and no formation of citric acid at all.

By subjecting the culture liquor obtained by adding n-amyl alcohol to the medium to the same treatment as described in Example 1, 49 g. of microbial cells (dry) and 4.5 g. of calcium citrate are obtained. The protein content of the microbial cells is 51.0%. From the control culture liquor obtained by cultivation without n-amyl alcohol, 48 g. of microbial cells is obtained with a protein content of 48.2%.

EXAMPLE 5

*Arthrobacter paraffineus* ATCC 15591 is cultured at 30°C. for 24 hours with aerobic shaking in 20 ml. of a medium containing 0.25% yeast extract, 0.5% meat extract, 0.5% peptone and 0.25% sodium chloride at a pH of 7.0 in a 250-ml. conical flask. The resulting culture is transferred, in a proportion of 10%, to 20 ml. of a fermentation medium contained in 500-ml. Sakaguchi flasks and having the following composition:

0.1% $KH_2PO_4$
0.1% $Na_2HPO_4 \cdot 12H_2O$
0.05% $MgSO_4 \cdot 7H_2O$
0.01% $FeSO_4 \cdot 7H_2O$
0.002% $MnSO_4 \cdot 4H_2O$
0.05% cornsteep liquor
2.0% $NH_4NO_3$
5% n-paraffin mixture (equal volume mixture of $C_{12}$, $C_{13}$ and $C_{14}$)
5% $CaCO_3$ Culturing is conducted at 30°C. with reciprocating shaking. Sodium monofluoroacetate is added thereto 6 hours after the initiation of culturing in a concentration of 0.1%. Then, the cultivation is continued for 4 days, whereby 18.2 mg/ml of calcium citrate (in terms of citric acid) is found to be accumulated in the culture liquor. Using the same medium in a control experiment, only 9.3 mg/ml of citric acid is obtained when no sodium monofluoroacetate is added to the medium.

An equal volume of 2 N-HCl is added to the culture liquor after the completion of culturing in order to dissolve all of the calcium citrate, and the microbial cells are removed therefrom by centrifugation. $NH_4OH$ is added to the resulting supernatant liquor to adjust the pH to 8.0, and after heating, about 360 mg. of the resulting calcium citrate is separated by filtration. By repeating this treatment once more, 332 mg. of calcium citrate crystals is obtained.

EXAMPLE 6

*Candida zeylanoides* ATCC 15585 is cultured at 30°C. for 2 days with aerobic shaking in a Sakaguchi flask containing 20 ml. of a medium comprising a 5% n-paraffin mixture (V/V), 0.5% meat extract, 0.5% polypeptone, 0.25% sodium chloride and 5% $CaCO_3$ at a pH of 6.0. The resulting culture is transferred, in a proportion of 10%, to Sakaguchi flasks, each containing 20 ml. of a fermentation medium comprising:

10% n-paraffin mixture (V/V)
0.3% $NH_4Cl$
0.1% $KH_2PO_4$
0.05% $MgSO_4 \cdot 7H_2O$
500 $\gamma$/l $MnSO_4 \cdot 4H_2O$
500 $\gamma$/l $CuSO_4 \cdot 5H_2O$
500 $\gamma$/l $(NH_4)_6Mo_7O_{24} \cdot 4H_2O$
200 $\gamma$/l $H_3BO_3$
200 mg/l Nonion OT-221 (surfactant)
5 ml/l soybean oil
1 mg/l thiamine
0.01% sodium monofluoroacetate
8% $CaCO_3$ The pH of the above medium is 6.0.

Culturing is carried out for 4 days under the same conditions as described in Example 5. After the completion of culturing, 105 mg/ml of calcium citrate (in terms of citric acid) and 12 mg/ml of calcium isocitrate (in terms of isocitric acid) are found to be accumulated in the resultant culture liquor. In a control experiment, culturing is carried out in the same manner but in a medium free of the monofluoroacetic acid. In this case, only 65 mg/ml of calcium citrate (in terms of citric acid) is formed, while 63 mg/ml of calcium isocitrate (in terms of isocitric acid) is accumulated in the culture liquor.

By treating the culture liquor after the completion of cultivation in the same manner as described in Example 5, 2.05 g. of calcium citrate is obtained from the medium cultivated in accordance with the present invention. The crystals obtained contain 10.3% of calcium isocitrate (in terms of isocitric acid).

EXAMPLE 7

*Candida lipolytica* ATCC 8661 is cultured at 30°C. for 2 days with aerobic shaking in a Sakaguchi flask containing 20 ml. of a medium comprising a 5% n-paraffin mixture (V/V), 0.5% meat extract, 0.5% polypeptone, 0.25% sodium chloride and 5% $CaCO_3$ at a pH of 6.0. The resulting culture is transferred, in a proportion of 10 %, to Sakaguchi flasks, each containing 20 ml. of a fermentation medium having the following composition:

10% n-paraffin mixture (V/V)
0.3% $NH_4NO_3$
0.1% $KH_2PO_4$
0.05% $MgSO_4 \cdot 7H_2O$
500 $\gamma$/l $MnSO_4 \cdot 4H_2O$
500 $\gamma$/l $CuSO_4 \cdot 5H_2O$
10 mg/l $FeSO_4 \cdot 7H_2O$
500 $\gamma$/l $(NH_4)_6Mo_7O_{24} \cdot 4H_2O$
200 $\gamma$/l $H_3BO_3$
200 mg/l Nonion OT-221 (surfactant)
5 ml/l soybean oil
0.1% cornsteep liquor
8% $CaCO_3$ The pH of this medium is 6.0.

Culturing is carried out with aerobic shaking under the same conditions as described in Example 5, and potassium ferrocyanide is added to the medium 24 hours after the initiation of culturing in order to give a concentration of 2.0% by weight therein. Culturing is then continued for a further 72 hours and, as a result, 4.6 mg/ml of calcium citrate (in terms of citric acid) and 10.8 mg/ml of calcium isocitrate (in terms of isocitric acid) are found to be accumulated in the resultant culture liquor.

The obtained culture liquor is collected from 50 flasks subjected to cultivation as described above, and $H_2SO_4$ is added thereto. The culture liquor is then filtered in order to remove the calcium salts and the microorganisms therefrom. Then, saturated $Ba(OH)_2$ is added to the culture liquor, wereby Ba salts are obtained. After the steps of lactonation, methylation, demethylation and lactonation, 1.25 g. of the lactone of isocitric acid is obtained.

When culturing is carried out in a control experiment in the same manner but in a medium containing no potassium ferrocyanide, 7.5 mg/ml of calcium citrate (in terms of citric acid) and 7.4 mg/ml of calcium isocitrate (in terms of isocitric acid) are accumulated in the fermentation liquor.

EXAMPLE 8

Culturing is conducted in the same manner as described in Example 7, using Candida zeylanoides ATCC 15585 as the microorganism. As a result, 12.1 mg/ml of calcium isocitrate (in terms of isocitric acid) and 5.0 mg/ml of calcium citrate (in terms of citric acid) are formed in the culture liquor at the completion of cultivation. By following the procedure described in Example 7, 1.44 g. of the lactone of isocitric acid is obtained.

When cultivation is carried out in the same manner but in a medium containing no potassium ferrocyanide as a control, 7.3 mg/ml of calcium isocitrate (in terms of isocitric acid) and 7.5 mg/ml of calcium citrate (in terms of citric acid) are formed in the culture liquor at the completion of culturing.

EXAMPLE 9

*Penicillium janthinellum* 581 ATCC 13154 is cultured at 28°C. on a malt extract agar-agar slant medium for 3 days. One platinum loop of the resultant seed culture is inoculated onto 20 ml. of a seed culture medium contained in a 250-ml. flask and having the following composition (pH 6.0):

5% n-paraffin mixture ($C_{12}$, $C_{13}C_{14}$) (V/V)
0.025% $KH_2PO_4$
0.025% $Na_2HPO_4 \cdot 12H_2O$ 0.02% MgSO$_4$·7H$_2$O
0.001% CaCl$_2$·2H$_2$O
0.001% MnSO$_4$·4H$_2$O
0.5mg/l ZnSO$_4$·7H$_2$O
10 mg/l FeSO$_4$·7H$_2$O
0.6 mg/l H$_3$BO$_3$
10 γ/l Na$_2$MoO$_4$·2H$_2$O
10 γ/l CoCl$_2$·6H$_2$O
10 γ/l CuSO$_4$·5H$_2$O
0.4% NH$_4$NO$_3$
0.3% cornsteep liquor
2% soybean oil
3% CaCO$_3$ Culturing is carried out with aerobic shaking of the culture at 28°C. for 3 days, and 2 ml. of the resulting culture liquor is transferred to 20 ml. of a fermentation medium having the same composition [except for the 10% n-paraffin mixture (V/V) and 5% CaCO$_3$] contained in a Sakaguchi flask. Then, culturing is carried out with aerobic shaking at the rate of 130 reciprocations/minute at 30°C. After 24 hours of cultivation, sodium monofluoroacetate is added to the medium in a concentration of 0.01%. Culturing is continued for a further 5 days and, as a result, 30 mg/ml of calcium citrate (in terms of citric acid) is formed in the culture liquor after the completion of culturing.

In a control experiment, where no sodium monofluoroacetate is added to the medium, only 12 mg/ml of calcium citrate (in terms of citric acid) is found to be accumulated in the resultant culture liquor.

From the above description, it can be seen that an alkali metal ferrocyanide, such as sodium ferrocyanide or potassium ferrocyanide, can be employed as the additive in obtaining increased yields of isocitirc acid. In a similar manner, the addition of monofluoroacetic acid or the alkali metal salts thereof, such as sodium monofluoroacetate or potassium monofluoroacetate, is effective in increasing the yield of citric acid.

The invention being thus described, it will be obvious that the same may be varied in many ways. Such variations are not to be regarded as a departure from the spirit and scope of the invention, and all such modifications as would be obvious to one skilled in the art are intended to be included herein.

We claim:

1. A process for producing citric acid together with microbial cells by fermentation which comprises culturing a hydrocarbon-assimilating microorganism capable of producing citric acid under aerobic conditions in an aqueous nutrient medium containing at least one hydrocarbon as the main carbon source in the presence of at least one alcohol without control of said microbial growth, said nutrient medium being able to support microbial growth but being unable to support production of citric acid substantially in the absence of said alcohol without control of microbial growth, accumulating citric acid and the resulting microbial cells in the culture liquor, and recovering the citric acid and the microbial cells therefrom.

2. The process of claim 1, wherein said microorganism belongs to a genus selected from the group consisting of Arthrobacter, Corynebacterium, Brevibacterium, Nocardia, Candida, Torulopsis, Endomyces, Pichia, Hansenula, Mycoderma, Endomycopsis, Aspergillus and Penicillium.

3. The process of claim 2, wherein culturing is carried out at a temperature of about 15° to 45°C. and at a pH of about 1.0 to 9.0.

4. The process of claim 1, wherein said alcohol contains from one to 20 carbon atoms.

5. The process of claim 1, wherein said alcohol is an saturated alcohol having from one to 20 carbon atoms.

6. The process of claim 1, wherein approximately 0.1 to 1.0% (V/V) of said alcohol is added to the medium.

7. The process of claim 1, wherein said hydrocarbon is an n-paraffin having from 11 to 20 carbon atoms.

8. The process of claim 1, wherein the nutrient medium further includes a surfactant.

9. The process of claim 1, wherein said microorganism is selected from the group consisting of *Torulopsis famata, Nocardia paraffinica, Penicillium janthinellum* and *Arthrobacter paraffineus.*

10. The process of claim 1, wherein said nutrient medium contains sufficient nitrogen source to avoid adverse affect upon the production of said microbial cells.

11. A process of producing citric acid together with microbial cells by fermentation which comprises culturing a hydrocarbon-assimilating microorganism capable of producing citric acid and belonging to a genus selected from the group consisting of Arthrobacter, Corynebacterium, Brevibacterium, Nocardia, Candida, Torulopsis, Endomyces, Pichia, Hansenula, Mycoderma, Endomycopsis, Aspergillus and Penicillium under aerobic conditions without control of microbial growth at a temperature of about 15° to 45°C. and a pH of about 1.0 to 9.0 in an aqueous nutrient medium containing at least one hydrocarbon as the main carbon source in the presence of approximately 0.1 to 1.0% by weight of at least one saturated alcohol having from one to 20 carbon atoms, said nutrient medium being able to support production of microbial cells, but being unable to support production of citric acid substantially in the absence of said alcohol without control of microbial growth, accumulating citric acid and the microbial cells in the culture liquor, and recovering the citric acid and the microbial cells therefrom.

12. The process of claim 11, wherein said hydrocarbon is an n-paraffin having from 11 to 20 carbon atoms.

13. The process of claim 11, wherein said microorganism is selected from the group consisting of Torulapsis famata, *Nocardia paraffinica, Penicilluum janthinellum* and *Arthrobacter paraffineus.*

14. The process of claim 11, wherein said nutrient medium contains sufficient nitrogen source to avoid adverse affect on the production of said microbial cells.

* * * * *